Dec. 22, 1936.    J. A. DORST    2,064,890
TRACK FOR TRACK LAYING VEHICLES
Filed Jan. 11, 1936
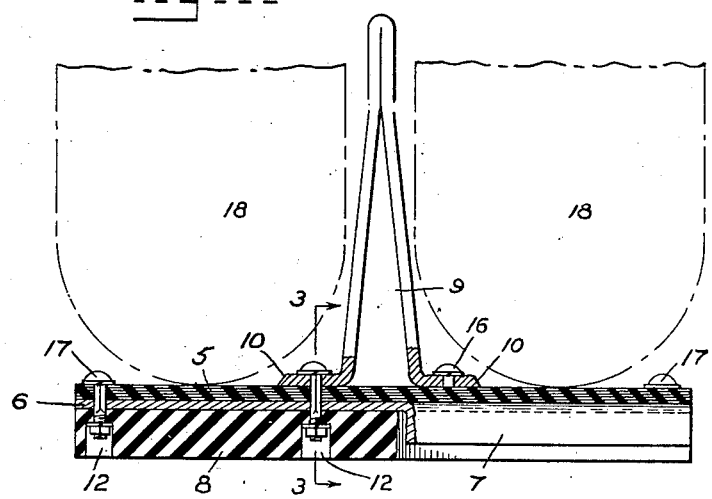
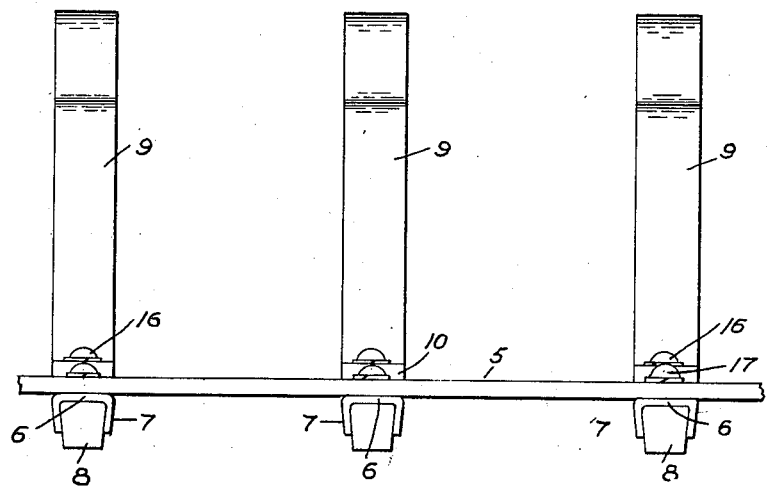
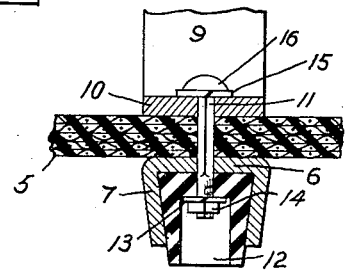
Inventor
James A. Dorst
By W. N. Roach
Attorney Patented Dec. 22, 1936

2,064,890

UNITED STATES PATENT OFFICE 2,064,890

TRACK FOR TRACK LAYING VEHICLES

James A. Dorst, United States Army, San Francisco, Calif.

Application January 11, 1936, Serial No. 58,708

1 Claim. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

In vehicles of the track-laying type, the weight of the vehicle is supported on wheels or rollers which ride on a continuous rail formed by or on the inner side of an endless flexible track. The track usually consists of interlocking links joined by hinge pins but the excessive strain on a track of this character necessitates frequent lubrication and constant renewal of the hinge pins. The irregularities in the path of travel entail considerable shock to the running gear and the links and rails are soon deformed.

The purpose of this invention, in addition to overcoming the defects noted above, resides in providing an inexpensive flexible track of light weight, having no moving joints, and presenting a broad continuous surface especially adapted to form a track for a pneumatic tire.

This invention is characterized by a novel association in which guide members and cleats are connected to opposite sides of a band by a unitary connection which also serves to prevent displacement of resilient inserts carried by the cleats.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a transverse sectional view of the track showing a portion of a cleat in elevation.

Fig. 2 is a view in side elevation.

Fig. 3 is a sectional view on the line 3—3 of Fig. 1.

Referring to the drawing by characters of reference, the track consists of an endless band 5 of commercially obtainable flexible belting composed generally of fabric and rubber.

A series of spaced cleats extending across the entire width of the band are each formed of a channeled metal plate 6 having converging walls 7—7 for retaining an insert 8 of resilient material, such as rubber, and constituting a tread whereby the track may operate on paved roads without causing damage.

Disposed on the inner side of the band in line with the cleats are spaced wheel guides 9 each consisting of a bent piece of strap metal and having a pair of feet 10—10 engaging the central portion of the band. A squared bolt 11 passing through each foot 10 and through the band 5, plate 6, and rubber insert 8 terminates in a recess 12 in the insert for the purpose of receiving a washer 13 and nut 14. A washer 15 is also interposed between the head 16 of the bolt and the foot 10.

A similar arrangement of unitary securing means is provided at the ends of the cleats by bolts 17—17.

The track is adapted to be used in conjunction with twin pneumatic tires 18—18, the guides 9 being disposed between the tires. When the track is trained about spaced wheels it is driven through friction and through a vacuum action produced between the driving tires and the band.

I claim:

A track for track-laying vehicles comprising an endless band of flexible non-metallic material, widely spaced channeled cleats extending across the entire width of the band on its outer side and including converging side walls, an insert of resilient material confined in each cleat coextensively therewith and having recesses, bolts passing through the band and the end portions of the cleats, a nut on each bolt housed in a recess of the insert, a wheel guide consisting of a bent metal strap having feet engaging the central portion of the inner side of the band, and bolts passing through the feet of the guide and through the band, cleat and insert, and a nut on each of said bolts housed in a recess of the insert.

JAMES A. DORST.